(12) United States Patent
Kapoor et al.

(10) Patent No.: US 8,346,755 B1
(45) Date of Patent: Jan. 1, 2013

(54) ITERATIVE OFF-LINE RENDERING PROCESS

(75) Inventors: Rupesh Kapoor, Palo Alto, CA (US); Erik Hendriks, Kirkland, WA (US); Sathayanarayana Giridhar, Palo Alto, CA (US); Andrei Pascovici, Bellevue, WA (US); Pawel Aleksander Fedorynski, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 94 days.

(21) Appl. No.: 12/773,578

(22) Filed: May 4, 2010

(51) Int. Cl.
*G06F 17/30* (2006.01)

(52) U.S. Cl. ...................................................... 707/710

(58) Field of Classification Search ........... 707/709–711
See application file for complete search history.

(56) References Cited

U.S. PATENT DOCUMENTS

| | | | |
|---|---|---|---|
| 6,271,840 B1 * | 8/2001 | Finseth et al. | 715/236 |
| 6,643,641 B1 * | 11/2003 | Snyder | 707/709 |
| 6,665,838 B1 * | 12/2003 | Brown et al. | 715/205 |
| 2006/0129463 A1 * | 6/2006 | Zicherman | 705/26 |
| 2010/0131488 A1 * | 5/2010 | Dasdan et al. | 707/709 |
| 2010/0241621 A1 * | 9/2010 | Randall | 707/709 |

* cited by examiner

*Primary Examiner* — Khanh Pham
(74) *Attorney, Agent, or Firm* — Brake Hughes Bellermann LLP (57) ABSTRACT

System and method for indexing rendered web page images. A web crawling engine stores the content and crawl time of a web page. A scheduling engine sends the content and crawl time to a rendering engine, and processes requests for embedded objects. If a requested object has been crawled, it sends the contents to the rendering engine. Otherwise it schedules the crawl of the object, and once the object is crawled, it resends the content and crawl time of the web page to the rendering engine. The rendering engine receives the content and crawl time of a web page, requests all embedded objects, and renders the web page to an image once all embedded objects are received.

26 Claims, 7 Drawing Sheets

ITERATIVE OFF-LINE RENDERING PROCESS

BACKGROUND

The world-wide-web is a rich source of information. Today, there are estimated to be over one trillion unique web pages. Many of these pages are dynamically created (e.g., the home page of the New York Times), and have links to embedded content such as images and videos. To fully index these web pages, they must be rendered as they would be by a web browser, i.e., they must be rendered as they exist when they are first created and served. While it is relatively straightforward for a web browser to render a single web page or a small number of web pages in real time (i.e., as they are created), it is much more difficult for a web page indexing process to render a large number of pages such as all of the pages on the world wide web (1 trillion pages) or even just the top 1% of pages on the world wide web (10 billion pages) in real time.

To completely render a received web page, the content of all of the external resources that may be embedded in the web page must first be obtained. Such resources may include, but are not limited to, external images, Javascript code, and style sheets. Often, the same external resource is embedded in many different web pages. For example, the Urchin Javascript code, available from Google, Inc., is embedded in tens of millions of different web pages. Whenever any one of these web pages is rendered, the Urchin Javascript code is downloaded from a Google server. While it is efficient for a single user's web browser to request an external web page resource such as the Urchin Javascript code in real time (i.e., when the page in which the resource is embedded is rendered), it is neither feasible nor efficient for the rendering engine of a web page image indexing process to do so. The rendering engine of a web page image indexing process is designed to render a large number of web pages at a time, and to continually render a large number of web pages at a time in order to build a large index or repository of imaged web pages. If such a rendering engine attempted to render thousands or tens of thousands of web pages that embed the same external resource at the same time or close together in time, the server on which the external resource resides would be flooded with near simultaneous requests for the same object. To avoid such problems, the rendering engine of a web page image indexing process should ideally crawl each embedded resource exactly once, regardless of how many web pages embed the resource, and should render web pages in a way that does not require the external resources to be gathered in real time.

SUMMARY

In one aspect, a system for indexing images of rendered web pages is disclosed. The system includes a web crawling engine, a scheduling engine, and a rendering engine. The web crawling engine crawls a web page and stores the content and crawl time of the web page in a data repository such as a database. The rendering engine receives the content and crawl time of the web page and the content of any objects that are embedded in the web page from a scheduling engine, renders the web page to an image file and stores the image file in a web page indexing data repository. The scheduling engine receives the content and crawl time of the web page from the data repository, sends the content and crawl time of the web page to the rendering engine, and schedules the rendering engine to render the web page to an image file.

Features and advantages of the system include one or more of the following. The scheduling engine can receive requests from the rendering engine for the contents of any objects that are embedded in the web page. The scheduling engine can determine whether the contents of the requested objects are stored in the data repository and send the contents of requested objects to the rendering engine if their contents are stored in the repository. If the contents of requested objects are not stored in the data repository, the scheduling engine can schedule the web crawling engine to crawl the requested objects and instruct the rendering engine to exit the rendering process until the requested objects are crawled by the web crawling engine.

In another aspect, a computer implemented method for scheduling the rendering of a web page is disclosed. The crawled content of a web page and a time the webpage was crawled is received from a local data repository and sent to a rendering engine. Requests from the rendering engine for objects that are embedded in the webpage are received and processed until all of the objects that are embedded in the web page are sent to the rendering engine. For each received request for an embedded object, it is determined whether the requested object is stored in the local data repository. If it is, the content of the requested object is retrieved from the local data repository and sent to the rendering engine. If it is not, a web crawling engine is scheduled to crawl the embedded object.

Features and advantages of the method include one or more of the following. If the content of a requested embedded object is not stored in the local data repository the rendering engine is instructed to exit the rendering process and the content of the web page and the time the webpage was crawled is stored in a second data repository. The content of the embedded object is received after it is crawled by the web crawling engine, and the content of the webpage and the time the webpage was crawled are sent back to the rendering engine. As before, requests from the rendering engine for objects that are embedded in the webpage are received and processed until all of the objects that are embedded in the web page are sent to the rendering engine. For each received request for an embedded object, it is determined whether the requested object is stored in the local data repository. If it is, the content of the requested object is retrieved from the local data repository and sent to the rendering engine. If it is not, a web crawling engine is scheduled to crawl the embedded object. When all of the objects requested by the rendering engine have been provided to the rendering engine, the scheduling process finishes.

In another aspect, a computer implemented method for rendering a web page to an image file is disclosed. A rendering engine receives the crawled content of a webpage and the time the web page was crawled. The rendering engine discovers and requests all objects that are embedded in the web page. For each requested object, the rendering engine determines whether the content of the embedded object has been received in response to the request for the object. If the content of any requested object is not received, the rendering engine terminates the rendering process. If the contents of all embedded objects are received, the rendering engine renders the webpage to an image file and stores the image file in an image indexing data repository.

Features and advantages of the method include one or more of the following. For each embedded object, the rendering engine determines whether the URL for the embedded object is dynamically generated and returns a different URL each time the embedded object is discovered. If the URL of the embedded object is dynamically generated, the rendering engine generates the same URL for the embedded object each time it is discovered. If the URL of the requested embedded object is generated based on the current time, the rendering engine generates the URL of the requested object using a time that is based on the crawl time of the webpage being rendered. The time can be determined by rounding down the crawl time of the webpage being rendered to the nearest multiple of a predefined value. If the URL of the requested embedded object is generated based on a number generated from a random number generator, the rendering engine generates the URL of the requested object using the same number in place of the randomly generated number each time the URL of the requested object is generated.

DETAILED DESCRIPTION

Figure 1:
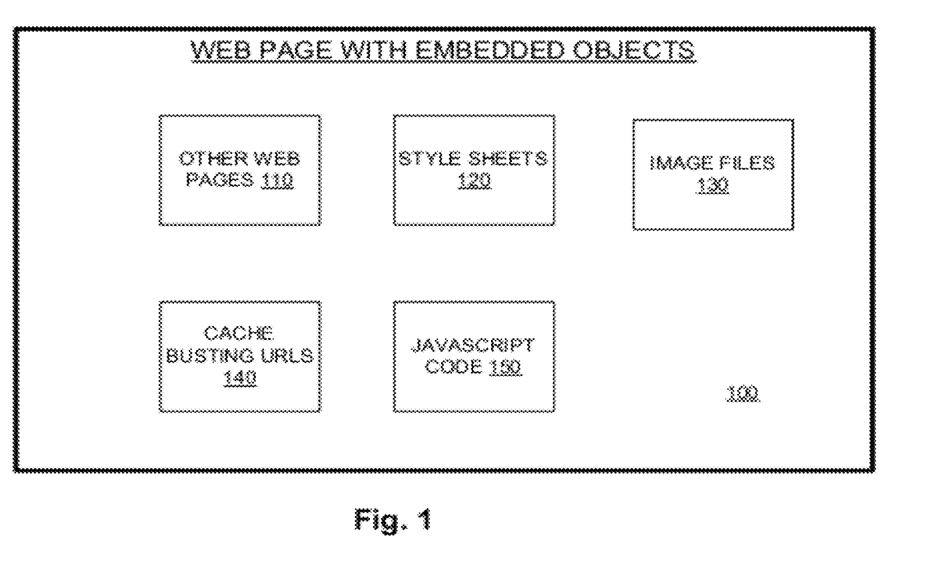
FIG. 1 is a block diagram of a web page having embedded object.

FIG. 1 is a block diagram of a web page having embedded objects. As shown in the figure, a web page 100 can contain a plurality of embedded objects. These embedded objects can include, but are not limited to, other web pages 110, style sheets 120, image files 130, so-called cache-busting URLs 140 and Javascript code 150. Additional, and different types of embedded objects, are of course possible. Moreover, each of the objects that are embedded in web page 100 may embed other objects. For example, a web page 110 that is embedded in web page 100 may embed other web pages, image files, style sheets and the like. Likewise, a style sheet 120 that is embedded in web page 100 may embed other objects such as a background image file. Further, each of the objects that are embedded in web page 110 or style sheet 120 may themselves embed even more objects. To completely render such a web page to an image file, a rendering engine must request each of the embedded objects 110-150 (primary embedded objects), all of the objects (secondary embedded objects) that are embedded in the embedded objects 110-150, and all of the objects (tertiary embedded objects) that are embedded in the objects that are embedded in embedded objects 110-150, and so on.

As discussed above, while an individual user's web browser can efficiently request all of these embedded objects and use them to completely render and display web page 100 in real time, the rendering engine of a web page indexing process cannot request all of these embedded objects in real time without the risk of flooding and perhaps even crashing web servers on which some of the more commonly embedded objects reside. Thus, to safely render a large number of crawled web pages to image files, a web page indexing system such as that disclosed in FIG. 2 can be employed.

Figure 2:
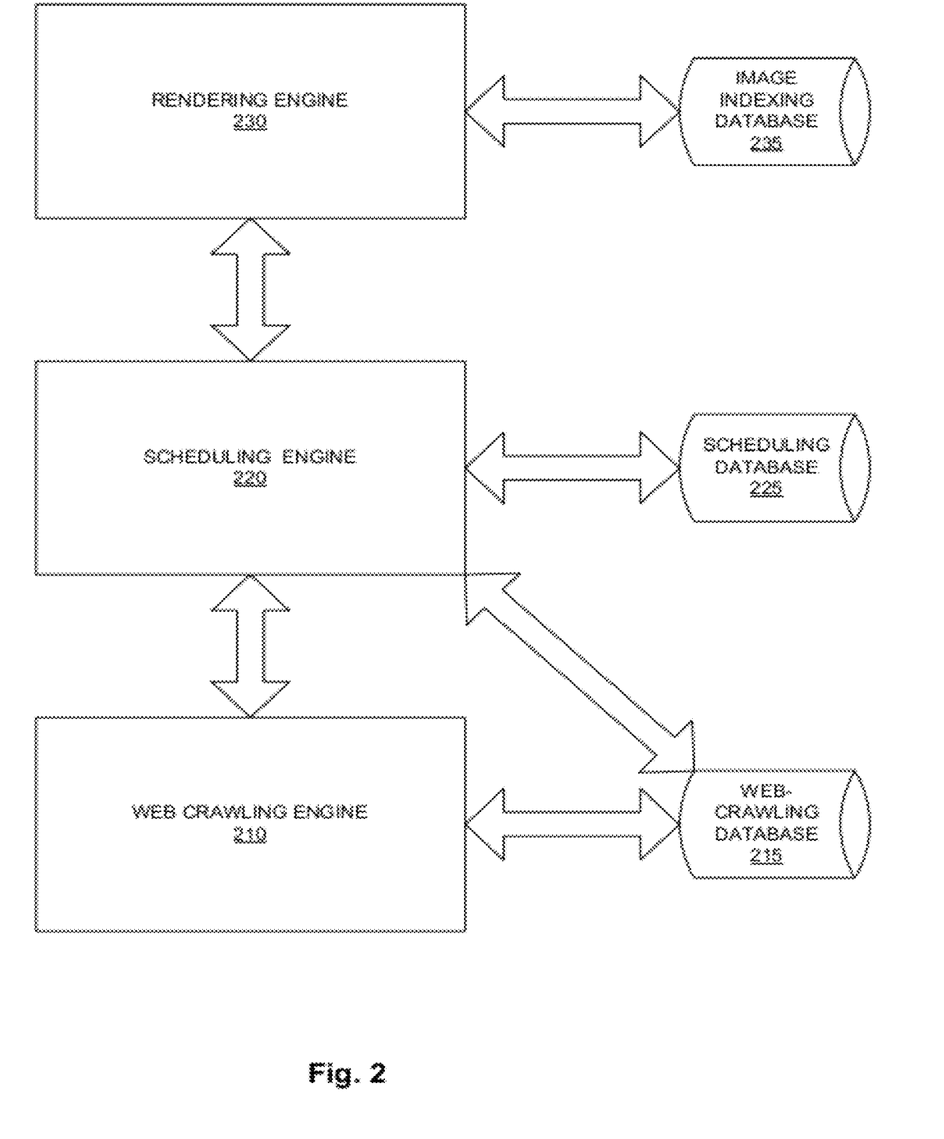
FIG. 2 is a block diagram of a system for indexing web page images.

FIG. 2 is a block diagram of a system for rendering and indexing web page images. As shown in FIG. 2, the system includes a web crawling engine 210 and associated database 215, a scheduling engine 220 and associated database 225, and a rendering engine 230 and associated database 235. The web-crawling engine 210, scheduling engine 220, and rendering engine 230 work together to safely and efficiently render a large corpus of web pages that can be found on the world wide web to image files, and to index the image files so rendered.

The web page image indexing process starts when the web-crawling engine 210 crawls a web page that can be found on the world-wide-web. When the web-crawling engine 210 receives the crawled web page, it stores the content of the web page and the time the web-page was crawled in a web-crawling database 215. As used herein, the content of a web page refers to the HTML code that is used by a web page rendering engine to render the web page for display in a web browser, and includes any links to external objects that are embedded in the web page such as style sheets, other web pages, or image files. The web-crawling engine 210 also notifies the scheduling engine 220 that the web page has been crawled. The scheduling engine 220 can receive the content and crawl time of the crawled web page either directly from the web-crawling engine 210 or from the web-crawling database 215, and can send the content and crawl time of the crawled web page to the rendering engine 230. Alternatively, the scheduling engine 220 can simply notify the rendering engine 230 that the content and crawl time of the crawled web page are available in a local database, such as the web-crawling database 215, and the rendering engine 230 can retrieve the content and crawl time of the web page from that database.

The scheduling engine 220 can also store the content and crawl time of the crawled web page in its own scheduling database 225. This can be useful in situations where the rendering engine 230 cannot immediately render the content of the crawled web page to an image file. In such cases, the content of the crawled web page that is stored in the web-crawling database 215 can change before the rendering engine 230 can render the page. This is especially true for web pages that rapidly change and that are frequently crawled due to their importance or page rank. For example, the home page for the New York Times (www.nytimes.com) is dynamically generated and frequently updated to reflect breaking news. It is also frequently crawled because it is an important and widely read source of news. If the rendering engine 230 is not able to immediately render the New York Time's home page shortly after an initial time $t_0$ when it is first crawled, it is possible that the home page will change and be re-crawled by the web crawling engine 210 at a subsequent time $t_1$. When the home page is re-crawled, the contents of the page stored in the web-crawling database 215 at time $t_0$ can be overwritten by the contents of the page crawled at time $t_1$. To avoid this, the content of the home page crawled at time $t_0$ can be stored in scheduling database 225. In this way, the scheduling engine 220 can ensure that the rendering engine 230 renders the content of the home page as it existed at time $t_0$. Of course, the scheduling database 225 can be eliminated if the web-crawling engine 210 stored both the content of the home page crawled at time $t_0$ and the content of the home page re-crawled at time $t_1$ in the web-crawling database 215.

Referring again to FIG. 2, when the rendering engine 230 receives the content and crawl time of the web page from the scheduling engine 220, it attempts to render the web page to an image file. To do so, the rendering engine 230 first needs to determine whether the web page contains any embedded objects such as style sheets, image files and the like. If the web page does not contain any embedded objects, the rendering engine 230 can simply render the web page to an image file, and store the rendered web page in the image indexing database 235. If, however, the web page contains embedded objects, the rendering server 230 requests those objects from the scheduling engine 220. The scheduling engine 220 then determines whether the content of all of the requested embedded objects are stored in either the scheduling database 225 or the web-crawling database 215. If the content of all of the requested embedded objects are stored in either database, the scheduling engine 220 sends the content to the rendering engine 220. The rendering engine 220 then determines whether the initially requested embedded objects (i.e., primary embedded objects) themselves have embedded objects (i.e., secondary embedded objects). If the primary embedded objects do not contain secondary embedded objects, the rendering server 230 can render the content of the web page, including the content of the primary embedded objects, to an image file, and store the image file in the image indexing database 235. If, however, the primary embedded objects themselves contain secondary embedded objects, the rendering engine 230 requests the secondary embedded objects from the scheduling engine 220. This process of discovering and requesting embedded objects is repeated until the rendering engine has discovered, requested, and either received the content of all of the objects that are embedded in the web page to be rendered (e.g., primary, secondary, tertiary, etc.) or, as explained below, has timed-out or received an instruction to discontinue the rendering process.

If, at any stage of the rendering process, the content of one or more of the requested embedded objects (whether primary, secondary, tertiary, etc.) is not stored in either the scheduling database 225 or the web-crawling database 215, the scheduling server 220 instructs the rendering server 230 to stop rendering the web page, and instructs the web-crawling engine 210 to schedule the crawl of the requested embedded objects. In one implementation, the scheduling engine 220 does not need to instruct the rendering engine 230 to stop the rendering process, as the rendering engine 230 will time-out and stop the rendering process on its own if it does not receive a requested embedded object within a predetermined period of time. Once the web-crawling engine 210 has crawled the requested embedded objects and stored them in the web-crawling database 215, it notifies the scheduling engine 220. The scheduling engine 220 then retrieves the content and crawl time of the web page that requested the embedded objects from the scheduling database 225, and sends it back to the rendering engine 230. The rendering engine 230 then repeats the process of discovering, requesting, and receiving embedded objects (if they have been crawled) or timing-out or receiving an instruction to stop the rendering process (if an embedded object has not been crawled), until all objects that are embedded in the web page (whether, primary, secondary, tertiary, etc.) have been received. At that point, the rendering engine 230 has all of the content it needs to render the web page to an image file. It renders the web page, and stores the image file in the image indexing database 235.

Figure 3:
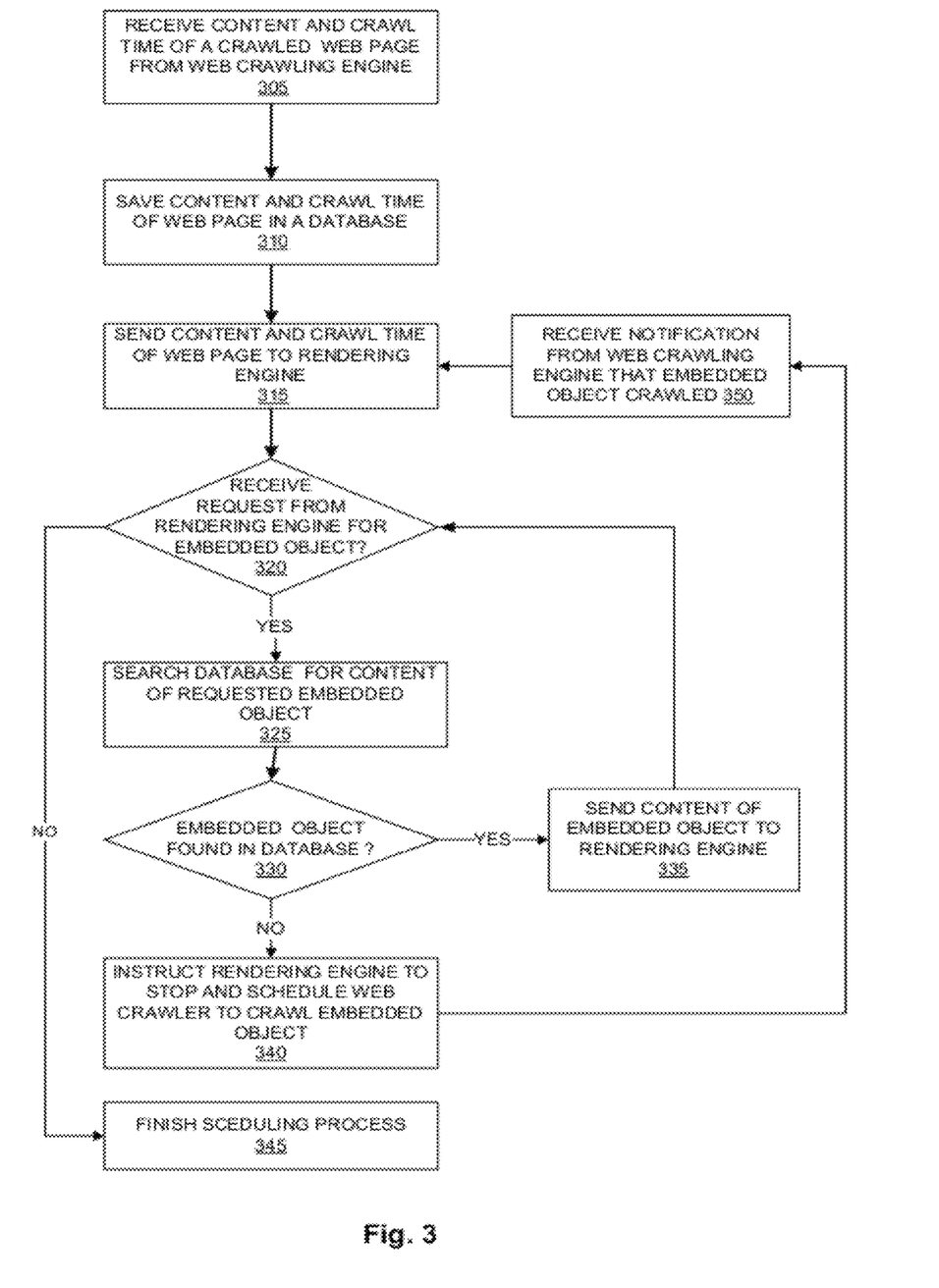
FIG. 3 is a flowchart illustrating a method by which a scheduling engine in a web page image indexing system can schedule a rendering engine to render a web page having embedded objects.

FIG. 3 is a flowchart illustrating a method by which a scheduling engine in a web page image indexing system can schedule a rendering engine to render a web page having embedded objects. As shown in FIG. 3, in one implementation, the scheduling engine 220 receives the content and crawl time of a web page to be rendered to an image file from a web-crawling engine 210 (305). Of course, in other implementations, instead of receiving the content and crawl time of the web page, the scheduling engine 220 can simply receive a notification from the web-crawling engine 210 that the web page has been crawled and is available for rendering to an image file. The scheduling engine 220 can then retrieve the content and crawl time of the web page from the web-crawling database 215. In one implementation, when the scheduling engine 220 receives the content and crawl time of the web page, it saves them to a scheduling database 225 (310). As discussed above, this prevents the web-crawling engine 210 from overwriting the content and crawl time of the web page in the event the rendering engine 230 is unable to render the web page to an image file before the web page is re-crawled, and the web-crawling engine 210 overwrites the content and crawl time of the web page in the web-crawling database 215. As noted above, in another implementation, the web-crawling engine 210 can save the content and crawl time of a web page without overwriting the content and crawl time of a previous crawl of the web page. In this implementation, the scheduling engine 220 does not need to store the content and crawl time of the web page in the scheduling database 225. When the scheduling engine 220 retrieves the content and crawl time of the web page, it sends this information to the rendering engine 230 (315). Of course, as noted above, rather than sending the content and crawl time of the web page to the rendering engine 230, the scheduling engine 220 can simply notify the rendering engine that the content and crawl time are available in either the web crawling database 215 or the scheduling database 225, and the rendering engine 230 can obtain the content and crawl time of the web page from one of those databases.

Once the scheduling engine 220 has sent the content and crawl time of the web page to the rendering engine 230, the scheduling engine 220 monitors any requests made by the rendering engine 230 for the content of an object that is embedded in the web page (320). If no such requests are made, the rendering engine 230 has all of the content it needs to render the web page, including the content of any embedded objects, and the scheduling engine 220 can finish the task of scheduling the rendering of the web page (345). If, however, the rendering engine 230 requests an object that is embedded in the web page (whether a primary, secondary, tertiary, etc. embedded object), the scheduling engine 230 receives the request (320), and searches the scheduling database 225 and the web-crawling database 215 for the content of the requested embedded object (325). If the scheduling engine 220 finds the content of the requested embedded object in either database (330), it retrieves and sends the content to the rendering engine 230 (335).

As before, rather than sending the content of the requested embedded object, the scheduling engine 220 can simply send the rendering engine 230 a message that the content of the requested embedded object is stored in one or the other database. In one implementation, if the scheduling engine 220 finds the content of the requested embedded object in the web-crawling database 215, it can copy the content to the scheduling engine database 225. As explained above, this is to preserve the content of the requested embedded object in the event the rendering engine 230 cannot immediately render the web-page in which the object is embedded, and the web-crawling engine 210 re-crawls the embedded object and overwrites the stored content of the embedded object in the web-crawling database 215.

Referring again to FIG. 3, the scheduling engine 220 will continue to receive and process requests from the rendering engine 230 for the content of all embedded objects (primary, secondary, tertiary, etc.) as described above, until either no more requests are received (320) or an embedded object requested by the rendering engine 230 cannot be found in either the scheduling database 225 or the web-crawling database 215 (330). If no more requests are received, the rendering engine 230 has all the content it needs to render the crawled web page and the scheduling engine 220 can finish the task of scheduling the rendering of the web page (345). If, however, a requested embedded object cannot be found in either the scheduling database 225 or the web-crawling database 215 (330), the scheduling engine 220 instructs the rendering engine 230 to stop the rendering process and schedules the web-crawling engine 210 to crawl the requested embedded object (340). As before, in other implementations the scheduling engine 220 does not need to instruct the rendering engine 230 to stop the rendering process since the rendering engine 230 will automatically time-out if it doesn't receive the content of a requested embedded object within a predefined period of time.

If the scheduling engine 220 instructs the web-crawling engine 210 to crawl an embedded object, the web-crawling engine 210 notifies the scheduling engine 220 when the object has been crawled and stored in the web crawling database 215. When the scheduling engine 220 receives this notification (350), it retrieves the content and crawl time of the web page to be rendered from the scheduling database 225, and sends this information to the rendering engine 230 to be processed as before (315).

The scheduling engine 220 will repeat this process of sending the content and crawl time of the web page to be rendered to the rendering engine 230, receiving and processing requests from the rendering engine 230 for the content of objects that are embedded in the web page, and either sending the content of the embedded objects to the rendering engine 230 if the content can be found in the scheduling database 225 or web-crawling database 215, or scheduling the crawl of the embedded objects with the web-crawling engine 210 if the content cannot be found, until the rendering engine 230 has received the entire content of the web page to be rendered, including the content of any embedded objects (primary, secondary, tertiary, etc.), at which point the scheduling engine 220 can finish the task of scheduling the web page to be rendered to an image file (345).

Figure 4:
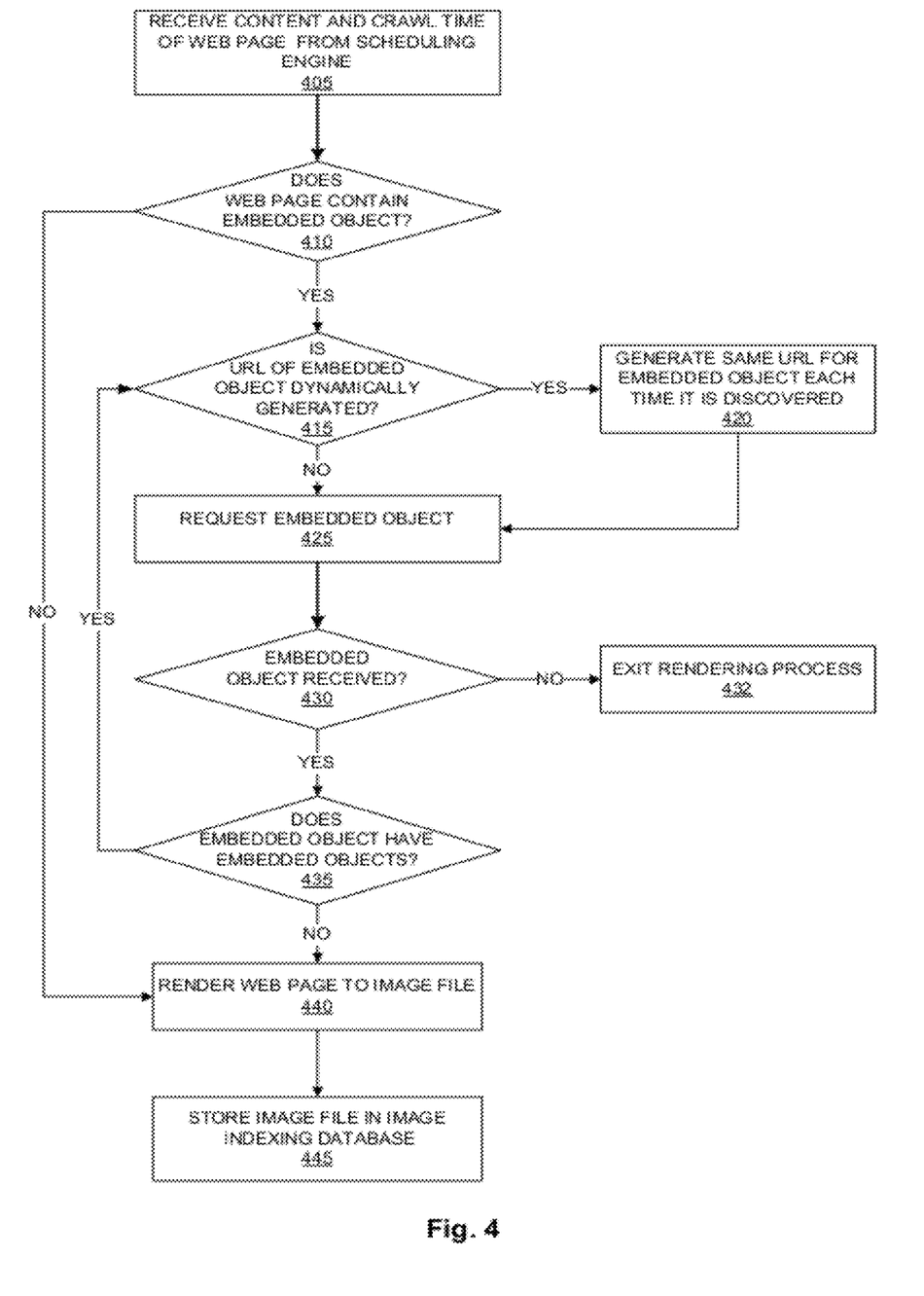
FIG. 4 is a flowchart illustrating a method by which a rendering engine in a web page indexing system can render a web page having embedded objects.

FIG. 4 is a flowchart illustrating a method by which a rendering engine in a web page indexing system can render a web page having embedded objects. As shown in FIG. 4, the rendering engine 230 receives the content and crawl time of a web page to be rendered to an image file from the scheduling engine 220 (405). As before, rather than receiving the content and crawl time of the web page, the rendering engine 230 can receive a notification that the content and crawl time of the web page are available in a database such as web-crawling database 215 or scheduling database 225, and can retrieve the content and crawl time from the database. The rendering engine 230 then determines whether the web page contains any embedded objects (410). If the web page does not contain any embedded objects (410), the rendering engine 230 can simply render the web page to an image file (440), and store the image file in an image indexing database 235 (445). If, however, the web page contains embedded objects (410), the rendering engine 230 must first determine whether the embedded objects have URL's that are dynamically generated (415).

Certain types of commonly embedded objects have URL's that are dynamically generated. For example, the URL's of some embedded objects depend upon a random number that is generated by a random number generator or on a current date and time that is returned by a date and time function. Embedded objects such as this, known as cache-busting tracking URLs, are commonly used to determine the number of unique hits or views of a web page for the purpose of determining advertising costs or revenues. While the contents of such embedded objects are usually identical, consisting of the same 1×1 pixel image, the a unique URL is generated for the object each time it is discovered by a rendering engine. Thus, for web pages containing such embedded objects, the rendering engine 230 will determine a new and different URL for the object each time it tries to render the web page, and will request the scheduling engine 220 to return the object pointed to by that new and different URL. As explained below, in order for the rendering process disclosed herein to converge, embedded objects having dynamically generated URL's must be modified so that they always generate the same URL each time they are discovered by the rendering engine 230.

Referring again to FIG. 4, if the rendering engine 230 determines that an object embedded in the received web page does not have a URL that is dynamically generated each time it is discovered (415), it simply requests the embedded object (425). If, however, the rendering engine 230 determines that an object embedded in the received web page has a URL that is dynamically generated each time it is discovered (415), the rendering engine 230 generates the same URL for the embedded object regardless of when the object is discovered (420) before requesting it (425).

The rendering engine 230 can generate the same URL for an embedded object whose URL is dynamically generated each time it is discovered in one of several ways. First, for an embedded object having a URL that includes a random number generated by a random number generator, the rendering engine 230 generates the same number whenever it discovers and generates the URL for the embedded object. For example, in one implementation, the rendering engine 230 replaces a randomly generated number with the same constant whenever it discovers an embedded object whose URL is dynamically generated to include a random number generated by a random number generator. In one implementation, the constant is 0.27832434, however, any other constant number can be used. Second, for an embedded object having a URL that includes a date and time obtained from a date and time function, the rendering engine 230 generates the date and time for the object's URL from the crawl time of the web page being rendered. More specifically, the rendering engine 230 rounds down the crawl time of the web page to the nearest multiple of a predefined value, and uses the nearest multiple of the predefined value as the date and time that is used to generate the URL for the embedded object. In one implementation, the crawl time of the web page being rendered is measured in seconds since Jan. 1, 1970, and the predefined value is 172,800 seconds, or the number of seconds in a two day interval. Other implementations, are of course possible. For example, the crawl time can be measured in minutes on a 24 hour clock, and the predefined value can be 10 minutes. Thus, if the crawl time of a web page occurred at 13:37 hours on Mar. 10, 2010, the rendering engine 230 would round down this crawl time to the nearest 10 minute interval, or to 13:30 hours on Mar. 10, 2010, and use that date and time to generate the embedded object's URL. Finally, the rendering engine 230 applies a set of rewrite rules to the URLs of all embedded objects to remove irrelevant parts of the URLs such as search strings or query parameters.

Once the rendering engine 230 requests the embedded objects (430), it waits to receive them. If the rendering engine 230 fails to receive one or more of the embedded objects it has requested (430), it cannot completely render the received web page, and so discontinues the rendering process (432). In one implementation, the rendering engine 230 discontinues the rendering process after receiving a message from the scheduling engine 220 to do so. As discussed above, the scheduling engine 220 can send the rendering engine 230 such a message when the contents of a requested embedded object is not currently stored in either the scheduling database 225 or the web-crawling database 215. In another implementation, the rendering engine 230 discontinues the rendering process on its own, e.g., by timing out after not receiving a requested embedded object after a predefined period of time.

If all of the embedded objects requested by the rendering engine 230 are received (430), the rendering engine 230 determines whether any of the received embedded objects (primary embedded objects) themselves have embedded objects (secondary embedded objects) whose content is needed to completely render the received web page (435). If none of the received embedded objects have any embedded objects (435), the rendering engine 230 renders the received web page to an image file (440), and stores the image file in an image indexing database 235 (440). If, however, one or more of the received (primary) embedded objects has its own (secondary) embedded objects (435), the rendering engine 230 repeats the process of determining whether the URL's of the (secondary) embedded objects are dynamically generated or not (415), and requesting the embedded objects (425) only after ensuring that the same URL will be generated for any of the object's whose URL's are dynamically generated each time they are discovered (420). The rendering engine then waits to receive the requested (secondary) embedded objects (430). If the requested (secondary) objects are not received, the rendering engine exits the rendering process (432). If, however, the requested (secondary) embedded objects are received, the rendering engine 230 repeats the process of determining whether any of the received (secondary) embedded objects themselves have (tertiary) embedded objects (435) and so on, until finally none of the embedded objects that are received (whether primary, secondary, tertiary, etc.) have embedded objects (435). At this point, the rendering engine 230 has all of the content it needs to render the received web page, including the content of the primary embedded objects, secondary embedded objects, tertiary embedded objects, and so on. The rendering engine 230 then renders the web page to an image file (440), and stores the image file in an image indexing database 235 (445).

Figure 5A:
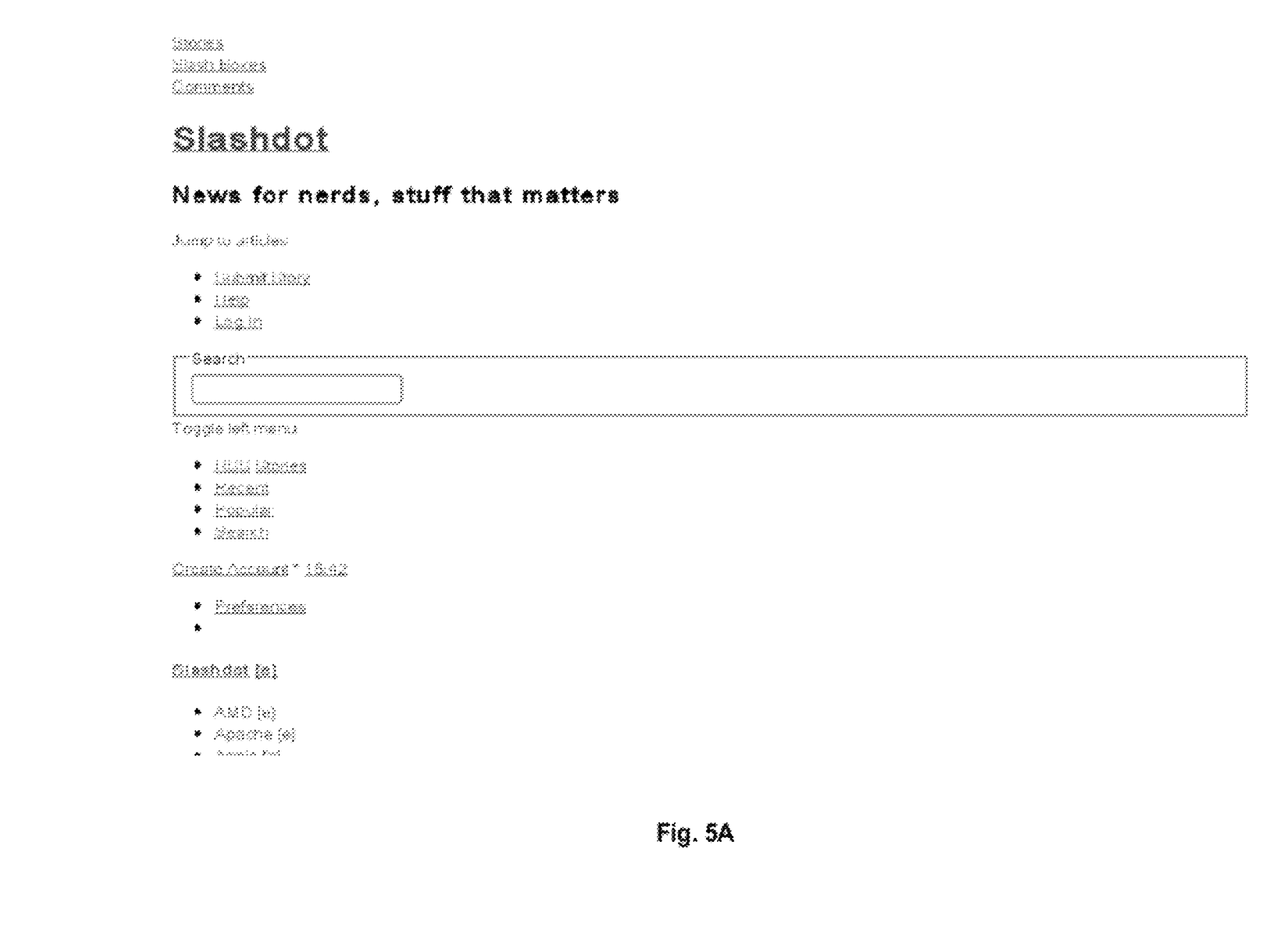
FIGS. 5A through 5C are schematic illustrations showing stages in the iterative web page rendering process that is performed by the web page image indexing system described herein.
Figure 5B:
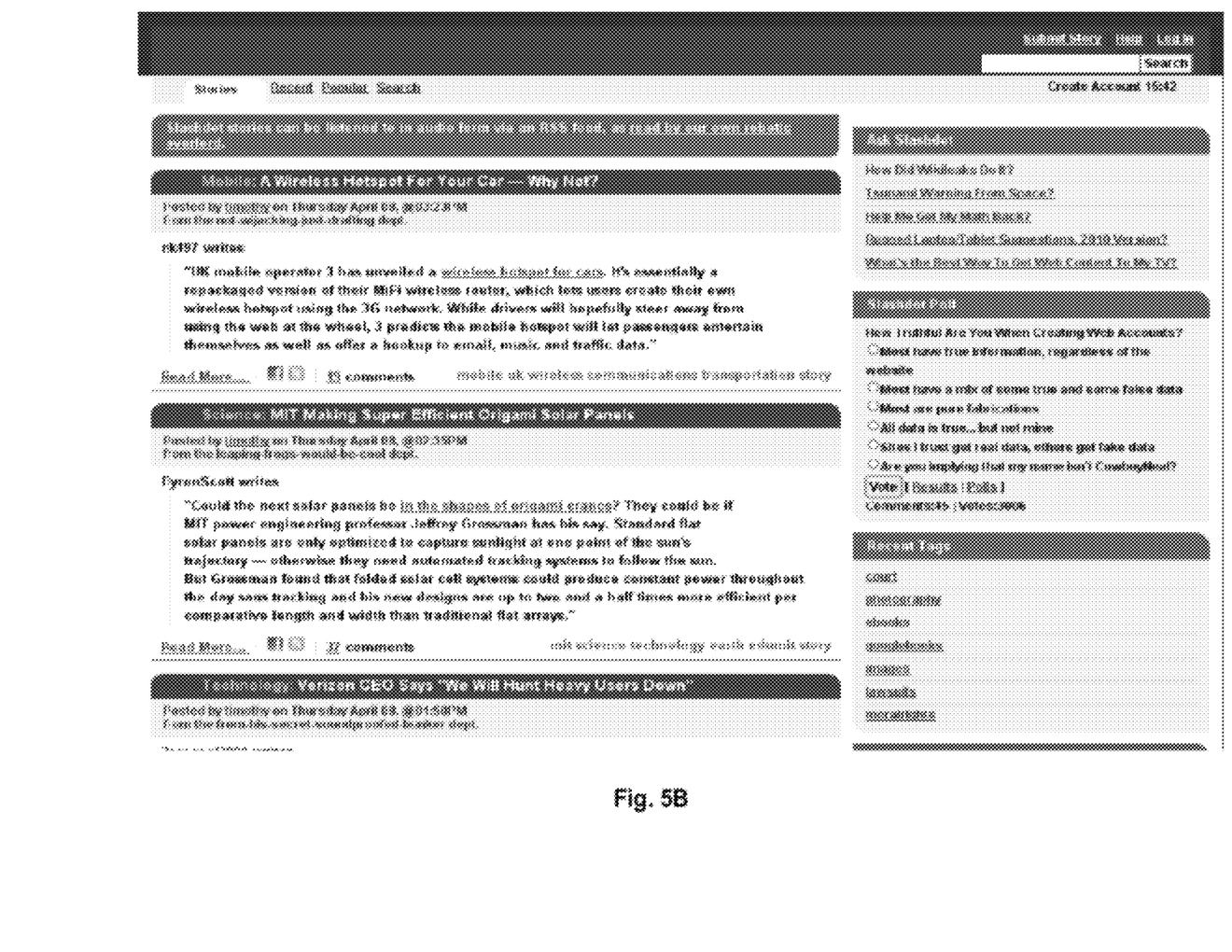
Figure 5C:
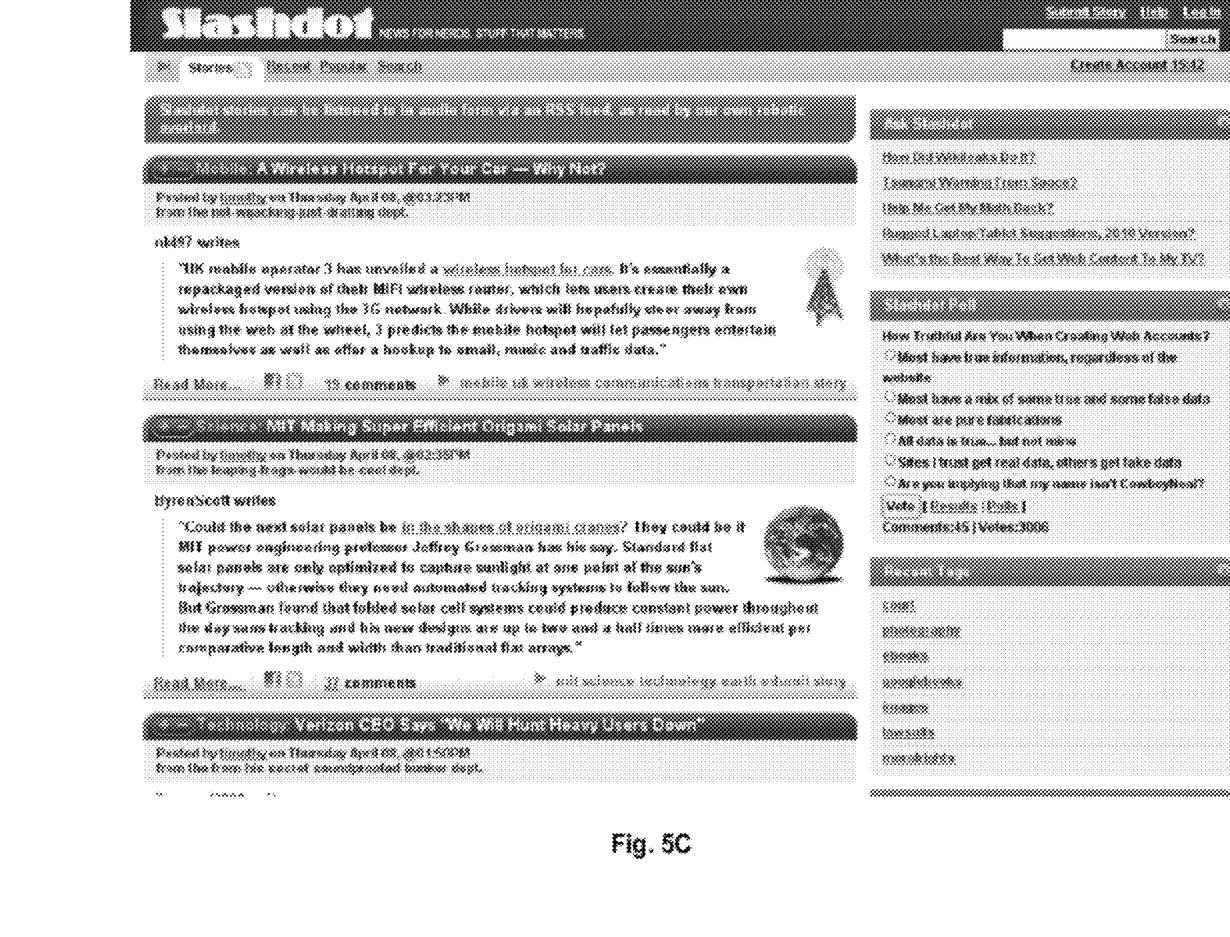

FIGS. 5A through 5C are schematic illustrations showing stages in the iterative web page rendering process that is performed by the web page image indexing system described herein. As shown in FIG. 5A, when the rendering engine 230 receives a web page to be rendered to an image file (here, the home page of SlashDot®), it may not initially have all of the content needed to completely render the web page to an image file. For example, the web page may have embedded objects such as image files, style sheets, and JavaScript code that contribute to the total content and formatting of the web page. Any attempt to render the web page to an image file without obtaining the content of such embedded objects will yield only a poorly rendered image of the web page as shown in FIG. 5A. Consequently, the rendering engine 230 does not render the web page to an image file, but rather identifies and requests all of the objects (primary embedded objects) that are directly embedded in the web page.

As shown in FIG. 5B, when the rendering engine 230 receives the primary embedded objects, it may still not have all of the content that is needed to completely render the web page to an image file. For example, the received primary embedded objects may themselves have embedded objects (secondary embedded objects) that are needed by the rendering engine 230 to completely render the web page to an image file. Any attempt to render the web page to an image file without obtaining the content of such secondary embedded objects will yield a more refined, though still incomplete image of the web page as shown in FIG. 5B.

Comparing FIGS. 5A and 5B, it is evident that one of the primary embedded objects in the SlashDot® homepage is a style sheet that lays out the formatting of the page. Thus, while FIG. 5A shows the links on the homepage (e.g., Submit Story, Help and Log In) as a vertically presented linear sequence, FIG. 5B shows the same links as a horizontally presented linear sequence. Similarly, FIG. 5B shows other links that are presented as a vertical sequence in FIG. 5A (e.g., RSS Stories, Recent, Popular and Search) as a second horizontally presented linear sequence. In addition, FIG. 5B also discloses that the style sheet that was received as a primary embedded object has focused the SlashDot® homepage on the Stories link, and that a plurality of RSS feeds, such as the "Mobile: A Wireless Hotspot For Your Care—Why Not?" feed, were also embedded in the SlashDot® homepage as primary embedded objects.

While the image shown in FIG. 5B is clearly more refined than the image shown in FIG. 5A, it is still an incompletely rendered image of the SlashDot® homepage. To generate a completely rendered image, the rendering engine 230 first identifies, then requests, all of the objects (secondary embedded objects) that are embedded in the objects (primary embedded objects) that are directly embedded in the home page. As noted above, the rendering engine 230 will continue to discover, request and receive all of the objects that are embedded in the SlashDot® homepage, whether primary, secondary, tertiary, etc., until all such embedded objects are received. At that point, the rendering engine 230 will have all of the content that is needed to completely render the SlashDot® homepage, will render the home page to an image file, and will store the rendered image in the image indexing database 235. Such a final rendered image is shown in FIG. 5C.

As shown in FIG. 5C, the rendering engine discovered several secondary embedded objects in the SlashDot® homepage. These include the SlashDot® logo displayed at the top of FIG. 5C that was likely embedded in the style sheet, two images that were respectively embedded in two RSS feed stories (e.g., the radio tower image embedded in the "Mobile: A Wireless Hotspot For Your Care—Why Not?" feed), and several control elements that were likely embedded in the style sheet and appear next to the titles of the RSS feed stories (e.g., the +/− or expand/contract control elements). As explained above, once the rendering engine has discovered all of the objects embedded in the SlashDot® homepage, it will render the page to an image file and store the rendered image in the image indexing database 235.

The methods and apparatus described herein may be implemented in digital electronic circuitry, or in computer hardware, firmware, software, or in combinations of them. They may be implemented as a computer program product, i.e., as a computer program tangibly embodied in a machine-readable storage device for execution by, or to control the operation of, a processor, a computer, or multiple computers. Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). The method steps may be performed in the order shown or in alternative orders.

A computer program, such as the computer program(s) described above, can be written in any form of programming language, including compiled or interpreted languages, and can be deployed in any form, including as a stand-alone program or as a module, component, subroutine, plug-in or other unit suitable for use in a computing environment. A computer program can be deployed to be executed on one computer or on multiple computers at one site or distributed across multiple sites and interconnected by a communications network. Processors suitable for the execution of a computer program include, by way of example, both general and special purpose microprocessors, and any one or more processors of any kind of digital computer, including digital signal processors. Generally, a processor will receive instructions and data from a read-only memory or a random access memory or both.

Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks. Machine readable media suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the methods and apparatus may be implemented on a computer having a display device, e.g., a cathode ray tube (CRT) or liquid crystal display (LCD) monitor, for displaying information to the user and a keyboard and a pointing device, e.g., a mouse, trackball or touch pad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The methods and apparatus described may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for rendering a web page to an image file, the system comprising:
   at least one processor of a computing system;
   a web crawling engine executed by the at least one processor of the computing system and configured to crawl a web page and to store the content and crawl time of the web page in a first repository;
   a rendering engine executed by the at least one processor of the computing system and configured to:
      receive the content and crawl time of the web page;
      determine if the web page contains any embedded objects;
      receive the contents of any such embedded objects; and
      render the web page to an image file once it has received the contents of all such embedded objects; and
   a scheduling engine executed by the at least one processor of the computing system and configured to:
      receive the content and crawl time of the crawled web page from the first repository;
      send the contents and crawl time of the web page to the rendering engine; and
      schedule the web page to be rendered to an image file by the rendering engine; wherein the scheduling engine is further configured to:
      send the content and crawl time of the web page that has been received from the first repository to the rendering engine; and
      schedule the web page to be rendered to an image file by the rendering engine; wherein the scheduling engine is further configured to:
      receive a request from the rendering engine for the content of an object that is embedded in the web page;
      determine whether the content of the requested object is stored in the first repository; and
      based on the determination of whether the content of the requested object is stored in the first repository, send the content of the requested object to the rendering engine if its content is stored in the first repository and schedule the web crawling engine to crawl the requested object if its content is not stored in the first repository.

2. The system of claim 1, wherein scheduling the web crawling engine to crawl the requested object includes scheduling the web crawling agent to crawl the requested object at a second server that is different than a first server that stores the content of the crawled web page.

3. The system of 1, further comprising a second repository configured for storing the crawled content of the web page and the time the webpage was crawled in when the content of a requested embedded object is not stored in the local data repository.

4. The system of claim 1, wherein the scheduling engine is configured to, iteratively, until all embedded objects contained in the web page are sent to the rendering engine:
   receive a request from the rendering engine for an object that is embedded in the web page;
   determine whether the content of the requested embedded object is stored in the local data repository;
   if the content of the embedded object is stored in the local data repository, retrieve the content of the embedded object and send the content to the rendering engine; and
   if the content of the embedded object is not stored in the local data repository, schedule the web crawling engine to crawl the requested embedded object.

5. The system of claim 1, wherein the scheduling engine is further configured to instruct the rendering engine to exit a process of rendering the web page if the content of an embedded object contained in the web page is not stored in the repository.

6. A computer implemented method comprising:
   crawling a web page with a web crawling engine;
   storing the content and crawl time of the web page in a local data repository;
   receiving the crawled content of the web page and the time the webpage was crawled from the local data repository;

sending the crawled content of the webpage and the crawl time to a rendering engine; and determining that the webpage contains a plurality of embedded objects;

iteratively, until all objects that are embedded in the web page are sent to the rendering engine:

receiving at a scheduling engine a request from the rendering engine for an object that is embedded in the webpage;

in response to the request, determining whether the content of the embedded object is stored in the local data repository;

if the content of the embedded object is stored in the local data repository, retrieving the content of the embedded object from the local data repository and sending the retrieved content to the rendering engine;

if the content of the embedded object is not stored in the local data repository, scheduling the web crawling engine to crawl the requested embedded object; and scheduling the webpage and its embedded objects to be rendered to an image file by the rendering engine.

7. The computer implemented method of claim 6, further comprising storing the crawled content of the web page and the time the webpage was crawled in a second data repository if the content of a requested embedded object is not stored in the local data repository.

8. The computer implemented method of claim 6, wherein the content of an embedded object is not stored in the local data repository, further comprising:

receiving the content of the embedded object after a web crawling engine has crawled the embedded object;

receiving the content of the webpage and the time the webpage was crawled;

sending the content of the webpage and the time the webpage was crawled to the rendering engine; and iteratively, until all objects that are embedded in the web page are sent to the rendering engine:

receiving a request from the rendering engine for an object that is embedded in the web page;

determining whether the content of the requested embedded object is stored in the local data repository;

if the content of the embedded object is stored in the local data repository, retrieving the content of the embedded object and sending the content to the rendering engine; and if the content of the embedded object is not stored in the local data repository, scheduling the web crawling engine to crawl the requested embedded object.

9. The computer implemented method of claim 6, further comprising instructing the rendering engine to exit the rendering process if the content of a requested embedded object is not stored in the local data repository.

10. A computer implemented method for rendering a web page to an image file through a rendering process, the method comprising:

crawling the web page with a web crawling engine;

storing the content and crawl time of the web page in a local data repository;

receiving the crawled content of a webpage and the crawl time of the web page;

sending the crawled content of the webpage and the crawl time to a rendering engine; and iteratively, until all objects embedded in the webpage have been received by the rendering engine:

determining whether the web page includes an embedded object;

if the web page includes an embedded object:

sending a request from the rendering engine to a scheduling engine for the content of the embedded object;

determining whether the content of the embedded object has been received by the rendering engine;

if the content of the embedded object has not been received by the rendering engine, exiting the rendering process and scheduling the web crawling engine to crawl the embedded object; and rendering the web page to an image file with the rendering engine after the content of all objects embedded in the webpage have been received by the rendering engine.

11. The computer implemented method of claim 10, wherein determining whether the web page includes an embedded object further comprises determining whether an object embedded in the webpage includes an embedded object.

12. The computer implemented method of claim 10, wherein it is determined that the web page includes an embedded object, further comprising:

determining whether the URL of the embedded object is dynamically generated and returns a different URL each time the embedded object is discovered; and if the URL of the embedded object is dynamically generated, generating the same URL for the embedded object each time the embedded object is discovered.

13. The computer implemented method of claim 12, wherein generating the same URL for the embedded object each time the embedded object is discovered comprises:

determining whether the URL of the embedded object is generated based on the current time; and if the URL of the embedded object is generated based on the current time, generating the URL of the embedded object using a time that is based on the crawl time of the web page being rendered.

14. The computer implemented method of claim 13, wherein the time that is based on the crawl time of the web page being rendered is obtained by rounding down the crawl time of the web page being rendered to the nearest multiple of a predefined value.

15. The computer implemented method of claim 12, wherein generating the same URL for the embedded object each time the embedded object is discovered comprises:

determining whether the URL of the embedded object is generated based on a number generated from a random number generator; and if the URL of the embedded object is generated based on a number generated from a random number generator, generating the URL of the embedded object using the same number in place of the randomly generated number each time the URL of the embedded object is generated.

16. A computer program product for scheduling the rendering of a web page, the computer program product being tangibly embodied on a machine readable medium and comprising instructions operable to cause one or more programmable processors to:

crawl a web page with a web crawling engine;

store the content and crawl time of the web page in a local data repository;

receive the crawled content of the web page and the time the webpage was crawled from the local data repository;

send the crawled content of the webpage and the crawl time to a rendering engine;

determine that the webpage contains a plurality of embedded objects; iteratively, until all objects that are embedded in the web page are sent to the rendering engine:
receive at a scheduling engine a request from the rendering engine for an object that is embedded in the webpage;
determine whether the content of the embedded object is stored in the local data repository;
if the content of the embedded object is stored in the local data repository, retrieve the content of the embedded object from the local data repository and send the retrieved content to the rendering engine;
if the content of the embedded object is not stored in the local data repository, schedule the web crawling engine to crawl the requested embedded object; and
schedule the webpage and its embedded objects to be rendered to an image file by the rendering engine.

17. The computer program product of claim 16, further comprising instructions operable to cause the programmable processor to store the crawled content of the web page and the time the webpage was crawled in a second data repository if the content of a requested embedded object is not stored in the local data repository.

18. The computer program product of claim 16, wherein the content of an embedded object is not stored in the local data repository, further comprising instructions operable to cause the programmable processor to:
receive the content of the embedded object after a web crawling engine has crawled the embedded object;
receive the content of the webpage and the time the webpage was crawled;
send the content of the webpage and the time the webpage was crawled to the rendering engine; and
iteratively, until all objects that are embedded in the web page are sent to the rendering engine:
receive a request from the rendering engine for an object that is embedded in the web page;
determine whether the content of the requested embedded object is stored in the local data repository;
if the content of the embedded object is stored in the local data repository, retrieve the content of the embedded object and send the content to the rendering engine; and
if the content of the embedded object is not stored in the local data repository, schedule the web crawling engine to crawl the requested embedded object.

19. The computer program product of claim 18, further comprising instructions operable to cause the programmable processor to instruct the rendering engine to exit the rendering process if the content of a requested embedded object is not stored in the local data repository.

20. The computer program product of claim 16, wherein scheduling the web crawling engine to crawl the requested object includes scheduling the web crawling agent to crawl the requested object at a second server that is different than a first server that stores the content of the crawled web page.

21. A computer program product for rendering a web page to an image file through a rendering process, the computer program product being tangibly embodied on a machine readable medium and comprising instructions operable to cause one or more programmable processors to:
crawl the web page with a web crawling engine;
store the content and crawl time of the web page in a local data repository;
receive the crawled content of the webpage and the crawl time of the web page;
send the crawled content of the webpage and the crawl time to a rendering engine; and
iteratively, until all objects embedded in the webpage have been received:
determine whether the web page includes an embedded object;
if the web page includes an embedded object:
send a request from the rendering engine to a scheduling engine for the content of the embedded object;
determine whether the content of the embedded object has been received by the rendering engine;
if the content of the embedded object has not been received, exit the rendering process and schedule the web crawling engine to crawl the embedded object; and
render the web page to an image file with the rendering engine after the content of all objects embedded in the webpage have been received by the rendering engine.

22. The computer program product of claim 21, wherein the instruction to determine whether the web page includes an embedded object further comprises an instruction to determine whether an object embedded in the web page includes an embedded object.

23. The computer program product of claim 21, wherein it is determined that the web page includes an embedded object, further comprising instructions operable to cause the programmable processor to:
determine whether the URL of the embedded object is dynamically generated and returns a different URL each time the embedded object is discovered; and
if the URL of the embedded object is dynamically generated, generate the same URL for the embedded object each time the embedded object is discovered.

24. The computer program product of claim 23, wherein the instruction to generate the same URL for the embedded object each time the embedded object is discovered comprises an instruction to:
determine whether the URL of the embedded object is generated based on the current time; and
if the URL of the embedded object is generated based on the current time, generate the URL of the embedded object using a time that is based on the crawl time of the web page being rendered.

25. The computer program product of claim 23, wherein the instruction to generate the same URL for the embedded object each time the embedded object is discovered comprises an instruction to:
determine whether the URL of the embedded object is generated based on a number generated from a random number generator; and
if the URL of the embedded object is generated based on a number generated from a random number generator, generate the URL of the embedded object using the same number in place of the randomly generated number each time the URL of the embedded object is generated.

26. The computer program product of claim 21, wherein scheduling the web crawling engine to crawl the requested object includes scheduling the web crawling agent to crawl the requested object at a second server that is different than a first server that stores the content of the crawled web page.

* * * * *

UNITED STATES PATENT AND TRADEMARK OFFICE
CERTIFICATE OF CORRECTION

PATENT NO. : 8,346,755 B1
APPLICATION NO. : 12/773578
DATED : January 1, 2013
INVENTOR(S) : Rupeshet Kapoor et al.

Page 1 of 1

It is certified that error appears in the above-identified patent and that said Letters Patent is hereby corrected as shown below:

In column 12, line 39, in claim 3, delete "system of 1," and insert -- system of claim 1, --, therefor.

Signed and Sealed this
Twelfth Day of March, 2013

Teresa Stanek Rea
*Acting Director of the United States Patent and Trademark Office*